(12) United States Patent
Stark et al.

(10) Patent No.: US 10,493,388 B2
(45) Date of Patent: Dec. 3, 2019

(54) CATALYTIC FILTER MATERIAL

(71) Applicant: W. L. Gore & Associates, Inc., Newark, DE (US)

(72) Inventors: Stephen K. Stark, Wilmington, DE (US); John P. Pasmore, Elkton, MD (US); Robert G. Eves, West Grove, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 15/780,629

(22) PCT Filed: Dec. 16, 2016

(86) PCT No.: PCT/US2016/067299
§ 371 (c)(1),
(2) Date: May 31, 2018

(87) PCT Pub. No.: WO2017/106730
PCT Pub. Date: Jun. 22, 2017

(65) Prior Publication Data
US 2018/0345190 A1    Dec. 6, 2018

Related U.S. Application Data

(60) Provisional application No. 62/268,832, filed on Dec. 17, 2015.

(51) Int. Cl.
*B01D 39/20* (2006.01)
*B01D 39/08* (2006.01)
(Continued)

(52) U.S. Cl.
CPC ....... *B01D 39/083* (2013.01); *B01D 39/1623* (2013.01); *B01D 39/1692* (2013.01);
(Continued)

(58) Field of Classification Search
CPC ...... B01D 2255/915; B01D 2239/0613; B01D 2239/06454; B01D 2239/08
(Continued)

(56) References Cited

U.S. PATENT DOCUMENTS 3,953,566 A    4/1976    Gore
4,220,633 A    9/1980    Pirsh
(Continued)

FOREIGN PATENT DOCUMENTS

DE    3633214 A1    3/1988
EP    0 391 660 A2   10/1990
(Continued)

OTHER PUBLICATIONS

International Search Report and Written Opinion issued in Application No. PCT/US2016/067299 dated Mar. 24, 2017.

*Primary Examiner* — Tom P Duong
(74) *Attorney, Agent, or Firm* — Greenberg Traurig, LLP (57) ABSTRACT

An improved catalytic filter material for use in removing target species found in a fluid stream is provided. The filter material includes water wettable, high temperature staple fibers in the form of porous substrates that are attached to a high temperature fluoropolymer woven scrim. The porous substrates have catalyst particles adhered (e.g., tethered) to the surfaces thereof by a polymer adhesive. Optionally, at least one microporous layer is positioned adjacent to or within the filter material.

18 Claims, 5 Drawing Sheets

(51) Int. Cl.
*B01D 39/16* (2006.01)
*B01J 21/06* (2006.01)
*B01J 23/22* (2006.01)
*B01J 37/02* (2006.01)

(52) U.S. Cl.
CPC ........ *B01D 39/2017* (2013.01); *B01J 21/063* (2013.01); *B01J 23/22* (2013.01); *B01J 37/0201* (2013.01); *B01D 2239/0407* (2013.01); *B01D 2239/0421* (2013.01); *B01D 2239/0613* (2013.01); *B01D 2239/0645* (2013.01); *B01D 2239/0654* (2013.01); *B01D 2239/0659* (2013.01); *B01D 2239/08* (2013.01); *B01D 2255/20707* (2013.01); *B01D 2255/20723* (2013.01); *B01D 2255/915* (2013.01); *B01D 2257/404* (2013.01); *B01D 2257/406* (2013.01)

(58) Field of Classification Search
USPC .......................................... 422/177; 428/36.2
See application file for complete search history.

(56) References Cited

U.S. PATENT DOCUMENTS

| | | |
|---|---|---|
| 4,309,386 A | 1/1982 | Pirsh |
| 4,732,879 A | 3/1988 | Kalinowski et al. |
| 4,983,434 A | 1/1991 | Sassa |
| 5,051,391 A | 9/1991 | Tomisawa et al. |
| 5,476,589 A | 12/1995 | Bacino |
| 5,620,669 A | 4/1997 | Plinke et al. |
| 5,814,405 A | 9/1998 | Branca et al. |
| 5,843,390 A | 12/1998 | Plinke et al. |
| 6,331,351 B1 | 12/2001 | Waters et al. |
| 2014/0246055 A1* | 9/2014 | Ebert ................. B01D 46/0027 134/16 |

FOREIGN PATENT DOCUMENTS

| | | |
|---|---|---|
| JP | H03-68409 A | 3/1991 |
| JP | H04-219124 A | 8/1992 |
| JP | H08-196830 A | 8/1996 |
| JP | H09-155123 A | 6/1997 |
| JP | H09-220466 A | 8/1997 |
| JP | H10-230119 A | 9/1998 |
| JP | H112990625 A | 10/1999 |
| JP | 2012-086217 A | 5/2012 |
| WO | WO-01/21284 A1 | 3/2001 |

* cited by examiner

CATALYTIC FILTER MATERIAL

CROSS REFERENCE TO RELATED APPLICATIONS

This application is a U.S. National Stage of International Application No. PCT/US2016/067299, filed on Dec. 16, 2016, which claims priority from U.S. Provisional App. No. 62/268,832, entitled "Catalytic Filter Material," filed Dec. 17, 2015, the disclosure of which are incorporated herein by reference in its entirety.

FIELD

The present disclosure relates to improved catalytic filtration materials which can remove undesirable species from a fluid stream.

BACKGROUND

Catalytic filters are employed for a variety of fluid filtering applications. Typically, these filters combine a catalytic material (e.g., $TiO_2$, $V_2O_5$, $WO_3$, $Al_2O_3$, $MnO_2$, zeolites, and/or transition metal compounds and their oxides) within a matrix. As the fluid passes over or through the matrix, target species within the fluid react with catalyst particles to convert the target species to a more desirable by- or end-product, and therefore remove the target species from the fluid stream. Examples of such catalysts include:

TABLE 1

Example Catalysts

| Target species | Active Material | Resulting Product(s) |
|---|---|---|
| $NO_x$, $NH_3$ | $TiO_2$, $V_2O_3$, $WO_3$ | $N_2 + H_2O$ |
| CO | $Al_2O_3$, Pt | $CO_2$ |
| Dioxin/Furan | $TiO_2$, $V_2O_3$, $WO_3$ | $CO_2$, HCl, $H_2O$ |
| $O_3$ | $MnO_2$ | $O_2$ |

Examples of previous attempts to produce a catalytic filter device include those set forth in U.S. Pat. Nos. 4,220,633 and 4,309,386, to Pirsh, where filter bags are coated with a suitable catalyst to facilitate the catalytic reduction process of $NO_x$. In U.S. Pat. No. 5,051,391, to Tomisawa et al., a catalyst filter is disclosed which is characterized in that catalyst particles which are made of metal oxides with a diameter of between 0.01 to 1 um are carried by a filter and/or a catalyst fiber. In U.S. Pat. No. 4,732,879, to Kalinowski et al., a method is described in which porous, preferably catalytically active, metal oxide coatings are applied to relatively non-porous substrates in a fibrous form. In patent DE 3,633,214 A1, to Ranly, catalyst powder is incorporated into multilayered filter bags by inserting the catalyst into the layers of the filter material. Further examples to produce catalytic filter devices include those set forth in JP 8-196830, to Fujita et al., in which a micropowder of an adsorbent, reactant, or the like is supported in a filter layer interior. In JP 9-155123, to Sasaki et al., a denitrification layer is formed on a filter cloth. In JP 9-220466, to Kaihara et al., a catalyst filter is made by impregnating a cloth of glass fibers with titanium oxide sol which is then heat treated and further impregnated with ammonium metavanadate. In JP 4-219124, to Sakanaya et al., a compact, thick, and highly breathable filter cloth is filled with catalyst for the bag filter material in order to prevent catalyst separation. In U.S. Pat. No. 5,620,669, to Plinke et al., the filter comprises composite fibers of expanded polytetrafluoroethylene (ePTFE) having a node and fibril structure, wherein catalyst particles are tethered within the structure. U.S. Pat. No. 6,331,351, to Waters et al. teaches chemically active particles attached to a porous substrate by means of a polymer adhesive. A microporous layer is attached to at least one side of, or within, the porous substrate. The resulting filter material removes contaminants such as dust, from the filter stream before the dust can clog active catalytic sites, as well as remove undesirable species by means of catalysis or reaction.

During filter operation, two main problems typically can occur with the conventional constructions, namely chemical deterioration and mechanical deterioration. With chemical deterioration, the chemical function of the filter can be rendered useless due to contamination, which is a serious problem with virtually every conventional active filter device, and especially for catalytic filter devices. Although, by definition, catalysts are not consumed during the catalytic reaction, catalytic filters may have limited operating lives due to particle, liquid, and gaseous contamination from a fluid stream (i.e., fine dust particles, metals, silica, salts, metal oxides, hydrocarbons, water, acid gases, phosphorous, alkaline metals, arsenic, alkali oxides, etc.). Deactivation occurs because the active sites on the active particles within the filter are physically masked or chemically altered. Unless these contaminants can be shed from the filter, the filter will rapidly diminish in efficiency until it must be replaced. Additionally, in some instances, the processing aids used in manufacture can cause deterioration of the catalysts. A variety of cleaning apparatus exist to remove dust from filters (e.g., shaker filter bags, back-pulse filter bags and cartridges, reverse air filter bags, etc.), but these devices are not particularly effective at removing dust embedded inside the filter material.

Another form of chemical deterioration is due to the loss of inserted catalysts during operation. The catalyst particles in many instances are not attached strongly enough to the host fibers to withstand the rigors of normal operation. As a result, the catalyst particles fall out of the filter, thereby not only diminishing filter effectiveness, but also contaminating the clean fluid stream.

With respect to mechanical deterioration, the mechanical function of the filter can deteriorate by abrasion of the filter fibers during operation or by the penetration and collection of dust contaminates in the filter. Another mechanical failure is due to dust particle break-through. Additionally, high temperature (e.g., at least 160° C.) operation and reactive chemical species in typical filtration systems and bag houses can cause deterioration of the filter media over several years or, in some cases, several months.

Japanese Patent Application No. 10-230119, assigned to ABB Co., Ltd., is directed to a filter material formed by immersing fibers to be formed into a filter cloth in a liquid catalyst, drying the catalyst, molding the fibers into a filter cloth and applying an ethylene tetrafluoride resin continuous porous thin film to the filter cloth. U.S. Pat. No. 5,620,669, described earlier, combines the concept of catalyst particle protection by a microporous membrane and the incorporation of catalyst particles attached directly to nodes and fibrils for strong adhesion and low pressure drop. U.S. Pat. No. 6,331,351 described earlier, addresses many of the chemical and mechanical challenges described. However, improved performance is still needed.

SUMMARY

One embodiment relates to an article that includes (1) a first porous substrate, (2) a second porous substrate, and (3)

a scrim positioned between and attached to the first and second substrates, wherein the first and second substrates include wettable, high temperature staple fibers, wherein at least one of the first porous substrate and the second porous substrate has catalyst particles adhered to the surface of the substrate by a polymer adhesive. The catalyst particles are tethered by the adhesive by strings of polymer. In at least one embodiment, the first and second substrates are fibrous batts that are entangled with the scrim. The scrim may be a woven or non-woven material. A protective microporous layer may be affixed to the upstream side of the first substrate.

A second embodiment relates to an article that includes a porous substrate including water wettable, high temperature staple fibers felted onto a high temperature fluoropolymer scrim. The porous substrate has catalyst particles adhered to the surface thereof by a polymer adhesive. In exemplary embodiments, the particles are tethered to the substrate by polymer adhesive strings. A protective microporous layer may be affixed to the upstream side of the substrate.

A third embodiment relates to a filter for use in a fluid stream that includes at least one porous substrate including at least one porous layer of water wettable, high temperature staple fibers felted onto a high temperature fluoropolymer scrim. The substrate has catalyst particles adhered to the surface thereof by a polymer adhesive. In exemplary embodiments, the catalyst particles are tethered to the substrate by polymer adhesive strings.

A fourth embodiment relates to a filter for use in a fluid stream that includes at least one porous substrate including at least one porous layer of non-woven polyimide fibers needled onto a polytetrafluoroethylene (PTFE) scrim. The filter has $V_2O_5$ on the anatase form of titanuim dioxide particles adhered to the porous layer by a polymer adhesive. The particles are tethered to the substrate by strings of polymer adhesive.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

As used herein, the term "water wettable" is intended to refer to a surface on which a sessile water droplet forms a contact angle less than 90° indicating that wetting of the surface is favorable, and the fluid will spread over a large area on the surface; while a contact angle greater than 90° generally means that wetting of the surface is unfavorable so the fluid will minimize its contact with the surface and form a compact liquid droplet. It is also to be appreciated that the term "filter," as used herein, is intended to encompass any device that blocks, traps and/or modifies particles or molecules passing through the device. The use of the term "fluid" in the present application is intended to encompass any form of readily flowing material, including liquids and gases. The term "catalytic" is intended to mean that the filter is capable of action upon one or more components, or "target species," of a fluid stream via catalysis, so that a modified specie(s) is formed. The term "high temperature fiber" as used herein is intended to encompass any fiber which can withstand continuous exposure to temperatures of at least 160° C. without significant thermal degradation.

The present disclosure is directed to an improved catalytic filter material for use in removing target species found in a fluid stream. The filter material includes water wettable, high temperature staple fibers in the form of porous substrates that are attached to a high temperature fluoropolymer scrim. In exemplary embodiments, the scrim is a woven scrim. In other embodiments, the scrim is a non-woven scrim. The porous substrates have catalyst particles adhered (e.g., tethered) to the surfaces thereof by a polymer adhesive. Optionally, at least one microporous layer is positioned adjacent to or within the filter material. With this filter material, pollutant gas components, or "target species," such as dioxins, furans, $NO_x$, CO, and the like, can be effectively removed from a fluid stream (i.e., catalyzed).

Figure 1:
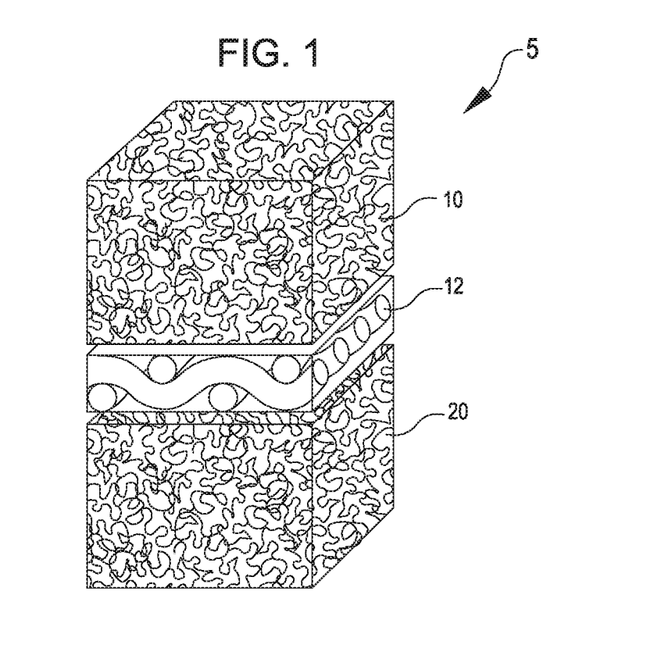
FIG. 1 is a schematic illustration of a filter material that includes porous substrates attached to a woven scrim support in accordance with an embodiment.

Turning to FIG. 1, an exemplary filter material 5 is depicted. The filter material 5 contains a scrim 12 (e.g., a woven scrim) attached to a first porous substrate 10 and a second porous substrate 20. In at least one embodiment, the porous substrates 10, 20 are water wettable, high temperature fiber batts that are entangled into the scrim 12. Water wettable fibers, high temperature fibers such as, but not limited to, polyimide, polyamide, polyaramid, polyphenylene sulfide, fiberglass, or staple fibers made with a tri-lobal polyimide staple fiber may be used in forming the porous substrates 10, 20. Additionally, fluoropolymer staple fibers (e.g., polytetrafluoroethylene (PTFE) or expanded polytetrafluorethylene (ePTFE) may be blended with the water wettable, high temperature resistant staple fibers to improve the mechanical durability of the high temperature fiber substrates 10, 20 that are attached to the scrim 12. In some embodiments, the scrim 12 may include a woven or non-woven polytetrafluoroethylene (PTFE) fabric.

Catalyst particles 14 are attached to the first and second substrates 10, 20 by a polymer adhesive. In at least one embodiment, the catalyst particles 14 are attached to the first porous substrate 10 (e.g., the upstream substrate) but not to the second porous substrate 20 (e.g., downstream substrate). As used herein, the term "polymer adhesive" is meant to include at least one thermoplastic elastomer or fluorinated polymer in the form of solid particles suspended in a liquid that is capable of forming polymer strings and dispersion primary particles which tether the active particles to the substrate, as well as the resulting fixed form of the polymer adhesive. Suitable polymer adhesives include, but are not limited to, polytetrafluoroethylene (PTFE), fluorinated ethylene propylene (FEP), high molecular weight polyethylene (HMWPE), high molecular weight polypropylene (HMWPP), perfluoroalkoxy polymer resin (PFA), polyvinylidene difluoride (PVDF), a polymer of tetrafluoroethylene, hexafluoropropylene and vinylidene fluoride (THV) and chloro-fluoro-ethylene (CFE). The composition of the polymer adhesive and the porous substrate may be the same or it may be different.

The polymer adhesive can be slurried with the catalyst particles before penetrating into the first and/or second substrate 10, 20 or the adhesive can be added to the desired substrate prior to, or after, adding the catalyst particles. The polymer adhesive is then fixed so as to attach the particles to the porous substrate. As used herein, the term "fixed," or "fixing," is intended to refer to drying to remove volatiles, heating, curing or melt-flowing. The content of the polymer adhesive solids in the final filter material composite can be from 1 to 90% by weight, and preferably 5 to 10% by weight.

More than one type of active particle may be present, either in the same layer or in adjacent layers. These adjacent layer(s) can have either the same or different substrate materials. Depending on the desired function and space considerations of a given system, two or more types of active particles can be added either to the same substrate or to adjacent substrate layers that are of the same or different composition. For example, catalyst particles and reactive particles can be incorporated in the same substrate to perform two different functions. In another example, the active particles can be in different layers. These examples can be further varied by using different polymer adhesives, which may be chosen depending on the desired performance (temperature, activity, etc.) of the filter.

Figure 2:
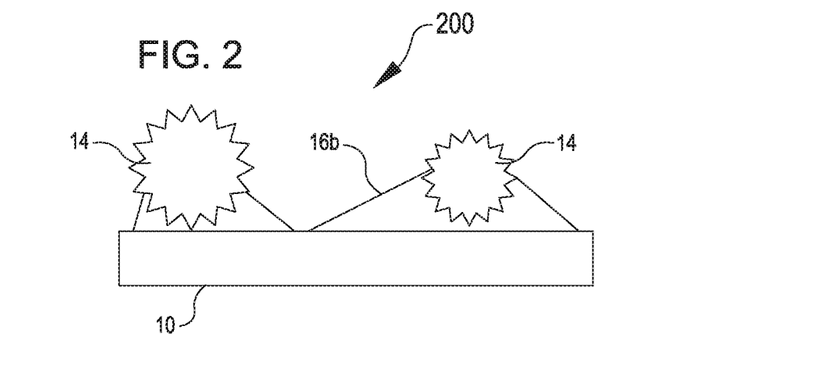
FIG. 2 is a schematic illustration of a polymer adhesive tethering and adhering the active catalyst particle to the substrate according to at least one embodiment.

FIG. 2 is a schematic representation of a filter material 200 showing how a polymer adhesive may hold the active catalyst particles 14 to a first substrate 10. As depicted, the catalyst particle 14 may be attached to the substrate 10 by small polymer adhesive strings 16b. "Strings" are intended to define small polymeric strands (such as, on the order of a few microns or less in diameter). The catalyst particles are substantially uniformly distributed throughout the thickness of the substrates 10, 20. "Substantially uniformly distributed" is meant to denote that the catalyst particles are uniformly or nearly uniformly distributed throughout the thickness of the substrates 10, 20.

An important feature of the active filter material 5 of the present invention is that it provides high strength in combination with the intimate adhesion of the active particles to the filter material via the polymer adhesive. These attributes make the filter material ideal for use in demanding environments, such as with shaker bag, reverse air, or pulse-jet filter cleaning assemblies. In an embodiment where the porous substrate includes woven or non-woven expanded PTFE fibers, since expanded PTFE fiber material is quite strong and resistant to abrasion, it can readily withstand the flexing and rigorous handling of filter cleaning systems.

In addition, the filter material has excellent reactivity with the target species in the fluids. The path of the fluid passing through the filter is tortuous because minimal or no straight pores exist in the substrate, thus allowing good contact of fluid with the active sites as the fluid passes through the filter material.

Figure 7:
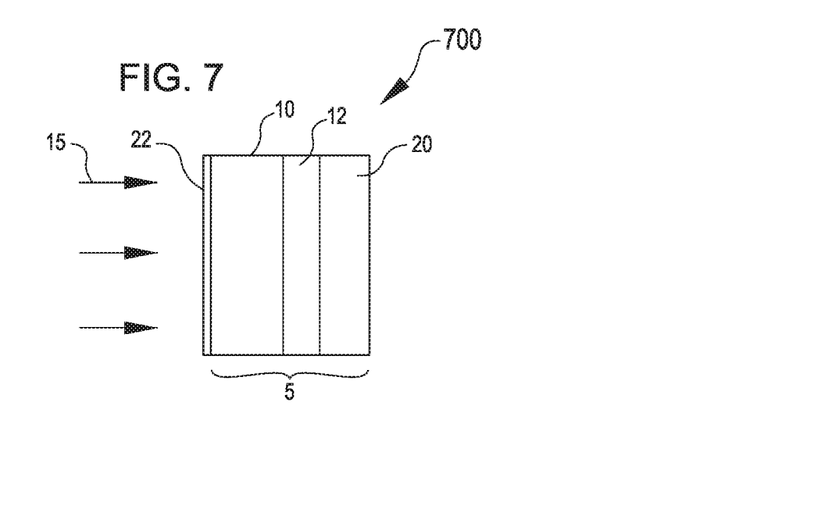
FIG. 7 is a schematic illustration of a cross-sectional view of a filter material where a microporous layer is provided on the upstream side of a first porous substrate in accordance with at least one exemplary embodiment.

In at least one exemplary embodiment, at least one microporous protective layer can be mounted on or within the porous substrate(s). In exemplary embodiments, the microporous layer is positioned on at least the upstream side (i.e., the side of filter which contacts the fluid stream to be filtered, as compared to the downstream side of the filter from which the filtered fluid stream exits the filter) of the active filter. As used herein, the term "microporous layer" is intended to refer to a layer having a thickness of at least 1 micrometer and having micropores on the order of 0.05 to 10 micrometers across. In exemplary embodiments, the microporous layer 22 includes an expanded microporous PTFE membrane.

FIG. 7 shows a cross-sectional perspective view of a filter material 200 including a layered assembly 5 with a protective microporous layer 22. The microporous layer 22 is provided on the upstream side of a first porous substrate 10, which is adjacent a second porous substrate 20. These active layers can be composed of different substrates, polymer adhesives, and active particles, the combination of which suits the specific application. A scrim layer 12 is positioned between the first and second porous substrates 10, 20. The fluid stream (direction of flow represented by arrows 15), including elements to be filtered (e.g., dust particles and pollutants), first contacts the microporous membrane 22. To protect the active particles within the first substrate 10 from contamination (such as from dust or other material blocking active sites), in the configuration shown, the microporous layer 22 is laminated to the first substrate 10 that is impregnated with catalyst particles. Dust particles and adsorbed pollutants which may be present on these dust particles are blocked by the microporous layer, thus preventing contact with the active particles attached to the porous substrate. The protective layer 22 provides significantly improved protection of the active filter material and longer effective life as compared to a filter without a microporous layer.

It was surprisingly found that a microporous layer 22 could be laminated or otherwise attached to the first porous substrate 10 and/or second porous substrate 20 without affecting the activity of the active particles. Proper selection and combination of the substrate, polymer adhesive, particles, and microporous layer is essential to maintaining functionality. Examples of suitable microporous layers include, but are not limited to, microporous ePTFE membranes, other polymeric (organic or inorganic) membranes, multi-layer membranes, asymmetric membranes, and other non-woven or woven materials.

While a variety of microporous layers may be employed, it is particularly preferred to employ an expanded PTFE membrane, such as that described in U.S. Pat. No. 3,953,566, to Gore, U.S. Pat. No. 5,476,589, to Bacino, and U.S. Pat. No. 5,814,405, the subject matter of these patent being specifically incorporated by reference herein, due to its exceptional filtration properties. Expanded PTFE (ePTFE) in the form of a membrane has a number of desirable properties which makes it a particularly desirable filtration material. For example, ePTFE has many microscopic holes or "micropores", such as on the order of 0.05 to 10 μm across, which allow fluid molecules to pass through but restrict the passage of particulates, such as fine dust and the like. Additionally, the surface of an expanded PTFE membrane can be readily cleaned of accumulated contaminants, vastly improving the operative life of the filter.

For some applications, it may also be useful to include more than one microporous layer, or even additional porous substrate filter layers, with or without a filler or other material, to provide additional levels of filtration. In such an embodiment, many more design parameters in the overall active filter material construction can be gained. By varying the number of layers, the location of the layers (e.g., upstream, within or downstream of the porous substrate) and the compositions of the layers, the filter materials can be made with varying properties, depending on the requirements of the desired application for the active filter material.

An exemplary material of the present disclosure is made in the following manner.

A porous substrate is provided having a suitable pore size to permit impregnation of active particles and polymer adhesive into the porous structure. By "particles" it is meant a material having any aspect ratio and thus includes flakes, fibers and spherical and non-spherical powders. A slurry of active particles and polymer adhesive flows unaided or aided by mechanical means into the porosity of the substrate. The amount of polymer adhesive is chosen so that there is sufficient adhesive to hold the particles to the substrate, but only a minimal amount of adhesive covers the surface of the active catalyst particles, thereby maximizing the reactivity of the active particles. Alternatively, the active particles and polymer adhesive may be incorporated into the substrate during formation of the porous substrate structure, such as by mixing the substrate component, active particles and polymer adhesive to form a coherent porous structure. As a further alternative, the active particles may be added to the substrate before or after the polymer adhesive is incorporated within the porous substrate.

The impregnated substrate is then provided with at least one microporous layer, such as a microporous membrane, within the porous substrate, on the downstream side of the substrate, or most preferably on the upstream side. This protective layer may be attached, either continuously or discontinuously, such as by means of lamination, welding, sewing, tacking, clamping, or other suitable attachment means. The protective microporous layer may optionally be configured so that it can also be removed and replaced, as needed, without disturbing the rest of the filter.

Suitable particles are those which catalyze or otherwise react with target species from the fluid stream. Suitable catalytic particles may include noble metals, non-noble metals, metal oxides (including transition metals and transition metal compounds), as well as alkali and alkaline earth, their oxides and carbonates. Preferred catalyst particles may include particles such as titania, alumina, silica and zeolites which have active surfaces thereon selected from noble metals (e.g., Pt, Pd, Au, and Rh including compounds thereof), vanadia, transition metal(e.g., Fe, Cu and Al, including compounds thereof). A particularly preferred catalyst comprises $V_2O_5$ on the anatase form of titanium dioxide. Examples of particles that otherwise react include, but are not limited to, sodium hydroxide and activated carbon treated with salts such as sodium carbonate, potassium iodide, and the like. The foregoing recitation is not meant to be exhaustive; rather, other suitable catalysts and reactive particle may be employed as well. Moreover, it is important to realize that a given type of reactive particles may act differently in different environments, i.e., sometimes acting as a catalyst and other times as a reactive material. In addition to the active particles, depending on the desired result, it may be desirable to include other optional particles, such as adsorbents, etc., in the devices of the present disclosure.

The active particles are included in the filter in an amount that will provide a wide range, such as up to 70% by weight, or higher, or from 10% to 30% by weight, in the substrate in relation to the final composite material.

Catalyst particles suitable for the present disclosure tend to be small, i.e., ordinarily less than 40 microns in size. The preferred size depends on the pore size of the substrate used and on the activity to size relationship of the active particle used.

It should be appreciated that there are numerous permutations of filter materials that can be made in accordance with the present disclosure. Among the combinations of material contemplated by the present disclosure are: (1) providing on the upstream side, within or on the downstream side at least one microporous layer, such as one or more layers of ePTFE membrane; (2) providing active particles of differing compositions within a given porous substrate; (3) constructing a filter with multiple layers of porous substrates of the same or differing compositions (i.e., porous layer composition, active particle composition, polymer adhesive composition); etc.

In one particularly preferred embodiment of the present disclosure, a filter may be provided which is particularly suited for use in treating pollutant gases, other target species, and particulates from the fluid stream therein. For instance, by employing a catalyst of $TiO_2$, $V_2O_3$, and $WO_3$, pollutants of NO, $NO_2$, and $NH_3$ will readily be modified into $H_2O$ and $N_2$ in the presence of oxygen. FIGS. 3-6, described below, show scanning electron micrographs (SEM) of various embodiments of porous substrates.

Figure 3:
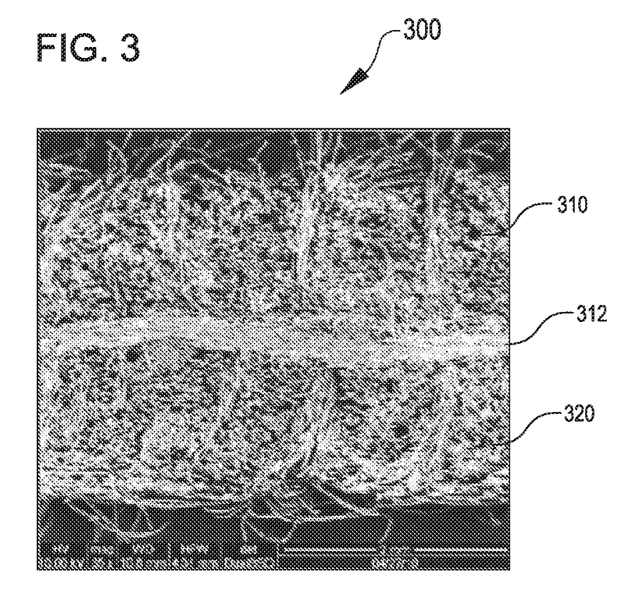
FIG. 3 is a scanning electron micrograph (SEM) of a cross-section of a porous substrate including water wettable, high temperature fibers taken at 35× magnification in accordance with one embodiment.
Figure 4:
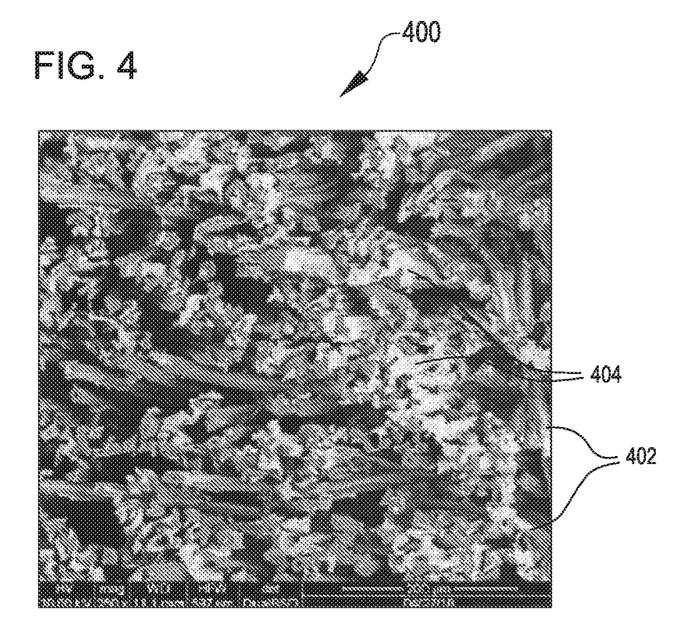
FIG. 4 is a scanning electron micrograph (SEM) of a surface of a porous substrate taken at 250× magnification showing catalyst particles adhered thereto in accordance with at least one embodiment.

FIG. 3 is a scanning electron micrograph (SEM) of a cross-section of a porous substrate 300 including water wettable, high temperature fibers taken at 35× magnification in accordance with one embodiment. The porous substrate 300 includes a first porous substrate 310 and a second porous substrate 320 entangled into the scrim 312, similar to the filter material 5 shown in FIG. 1. FIG. 4 is a scanning electron micrograph (SEM) of a surface of a porous substrate 400 taken at 250× magnification showing catalyst particles 404 adhered to water wettable, high-temperature fibers 402, in accordance with at least one embodiment.

Figure 5:
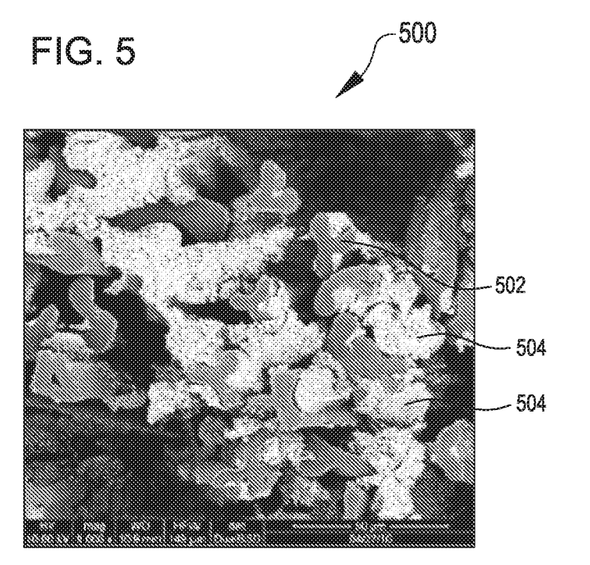
FIG. 5 is a scanning electron micrograph (SEM) of a cross-section of a porous substrate depicting tri-lobal shaped, water wettable, high temperature fibers with catalyst particles adhered thereto taken at 1000× magnification in accordance with one or more embodiment.
Figure 6:
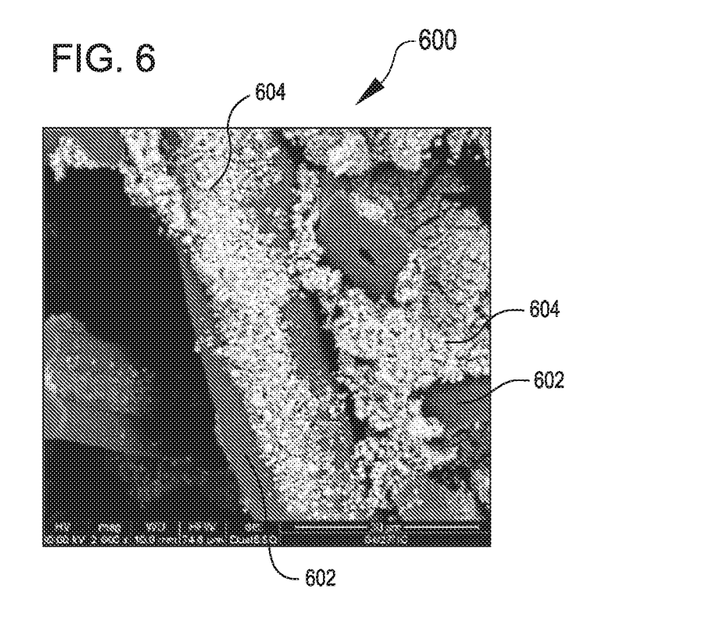
FIG. 6 is a scanning electron micrograph (SEM) of a length-wise view of a porous substrate showing tri-lobal shaped, water wettable, high temperature fibers with catalyst particles adhered thereto in accordance with another embodiment.

FIG. 5 is a scanning electron micrograph (SEM) of a cross-section of a porous substrate 500 depicting tri-lobal shaped, water wettable, high temperature fibers 402 with catalyst particles 404 adhered thereto taken at 1000× magnification in accordance with one or more embodiments. FIG. 6 is a scanning electron micrograph (SEM) of a length-wise view of a porous substrate 600 showing tri-lobal shaped, water wettable, high temperature fibers 602 with catalyst particles 604 adhered thereto in accordance with another embodiment.

Figure 8:
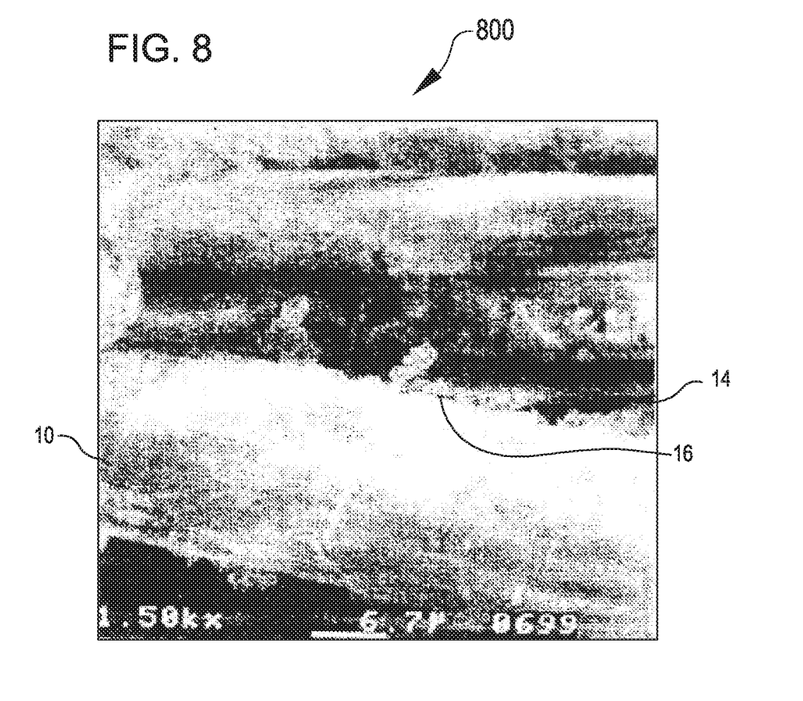
FIG. 8 is a scanning electron micrograph (SEM) of active catalyst particles attached to a polytetrafluoroethylene (PTFE) fiber by a polymer adhesive in a PTFE porous substrate taken at 1500× magnification according to yet another embodiment.

FIG. 8 is a scanning electron photomicrograph (SEM) showing a porous substrate 800 having active catalyst particles 14 attached by polymer adhesive 16 to the fiber 14 of a polytetrafluoroethylene (PTFE) fiber of an ePTFE felt substrate, taken at 1500× magnification.

This filter material, as well as the unique manufacturing process, allows a wide range of filter parameters, such as active particle loading, filter thickness, filter permeability, flow field (i.e., volume within the filter which the gas to be filtered flows through) around the active particles to obtain excellent gas/catalyst contact, filter strength, active particle protection, filter pore size distribution and proximity, active particle size, active particle shape, and active particle surface area.

Another embodiment relates to a filter material that includes at least one needle-felted substrate that includes water wettable, high temperature staple fibers. Such a structure enables high mass loadings of catalyst particles (e.g. a mass loading of catalyst particles of at least 250 g/m$^2$) to be applied the felt, while maintaining high air permeability. High loadings of catalyst particles enable high NOx removal efficiency of the catalytic material in order to meet strict environmental regulations. High air permeability values are critical for enabling the catalytic filter materials to be used in filter bags with an acceptable operating flow rate and low pressure drop.

EXAMPLES

Example 1

A filter material including 41.5% weight percent catalyst, 8.5% weight percent PTFE and 50 weight percent P84 substrate was fabricated in the manor described below.

A felt substrate of needled polyimide fibers, P84, with a P84 scrim measuring 4.5 inches by 4.5 inches, 0.105 inches thick, and weighing 6.4 grams was obtained (Southern Felt Co. Inc., North Augusta, S.C.). A slurry that included 1.9 g of 60 percent by weight polymer adhesive solution (polytetrafluoroethylene (PTFE) aqueous dispersion), 27.5 g of de-ionized water and 5.9 grams of catalyst (3% $V_2O_5$ on $TiO_2$, 1 micron average diameter, sold in extrudate form as S096, CRI, Houston Tex.) was prepared and then shaken for 1 minute to mix the components.

The resulting slurry was poured over a surface of the felt substrate and was distributed throughout the felt using a circular glass petri dish to press the slurry into the felt. The felt substrate was flipped and pressed again with the petri dish to enhance the uniformity of the slurry in the substrate. The impregnated felt substrate was then placed on a wire frame and heated in an oven at 245° C. for 1 hour. The final weight of the sample after coating was 12.8 g, resulting in a total solids uptake of 6.4 g. The impregnated felt comprised retained 98% of the solids from the slurry solution and contained 41.5% catalyst by weight of the total substrate.

Example 2

A felt substrate of needled polyimide fibers P84 with a polytetrafluoroethylene (PTFE) scrim measuring 4.5 inches by 4.5 inches, 0.09 inches thick and weighing 6.05 g was obtained (Southern Felt Co. Inc., North Augusta, S.C.). This material was coated using the same procedures and coating slurry as described in Example 1. The final weight of the sample after coating was 12.1 g, resulting in a total solids uptake of 6.05 g. The impregnated felt substrate retained 93% of solids from the slurry solution and contained 41.5% catalyst by weight of the total substrate.

Comparative Example

A felt substrate of needled expanded polytetrafluoroethylene (ePTFE) fiber with a polytetrafluoroethylene (PTFE) scrim measuring 4.5 inches by 4.5 inches, 0.04 inches thick, and weighing 9.8 g was obtained (W. L. Gore & Associates, Inc., Elkton Md.). This material was coated using the same procedures and coating slurry as described in Example 1. The final weight of the sample after coating was 11.5 g, resulting in a total solids uptake of 1.7 g. The impregnated felt retained 26% of the solids from the slurry solution and contained 12.5% catalyst by weight of the total substrate.

Figure 9:
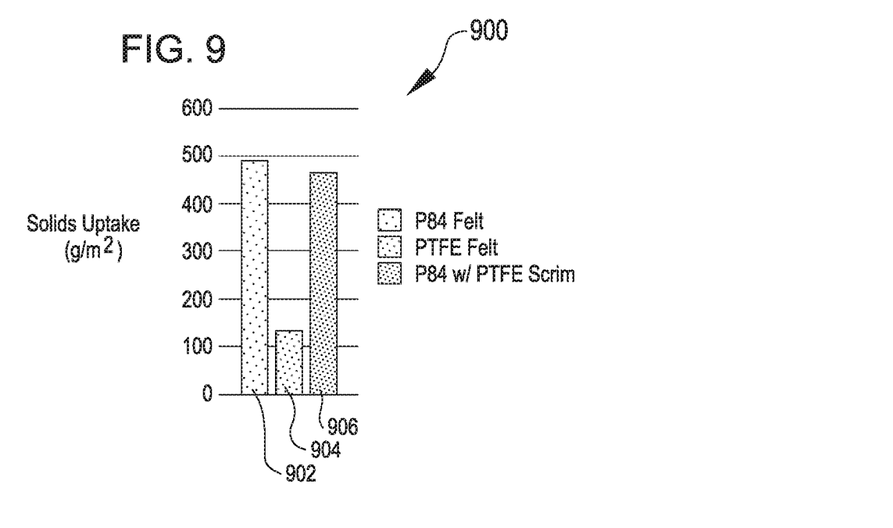
FIG. 9 is a graphical illustration of solids uptake for the coated substrates described in the Examples.

FIG. 9 is a graphical illustration 900 showing solids uptake for the coated substrates described in the Examples, including P84 felt 902, PTFE felt 904, and P84 felt with a PTFE scrim 906.

Figure 10:
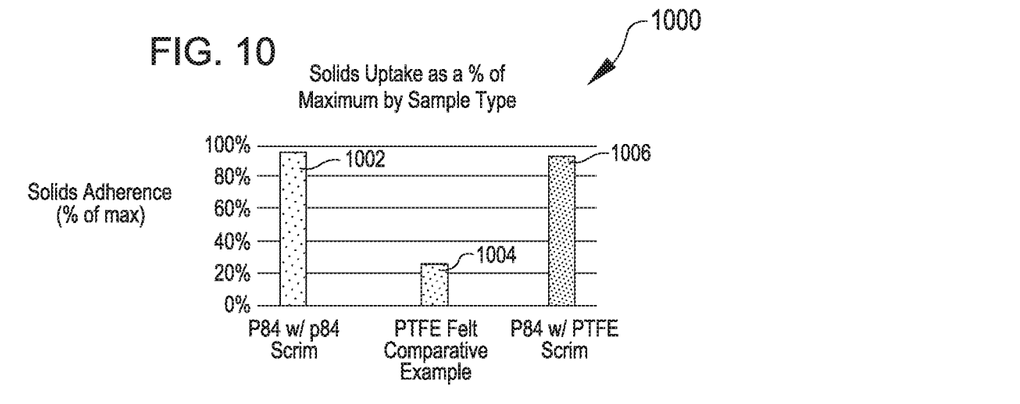
FIG. 10 is a graphical illustration of the solids uptake of the coated substrates as a percent of maximum by sample as described in the Examples.

FIG. 10 is a graphical illustration 1000 showing solids uptake of the coated substrates as a percent of maximum by sample as described in the Examples, including P84 with a P84 scrim 1002, PTFE felt only 1004 (as a comparative example), and P84 with a PTFE scrim 1006.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. An article comprising:
   A porous felt substrate consisting essentially of polyimide fibers attached to a high temperature fluoropolymer scrim, said porous felt substrate having catalyst particles adhered to a surface of the porous felt substrate by a polymer adhesive,
   wherein the particles are tethered to the porous felt substrate by adhesive strings of polymer; and
   wherein a mass loading of the catalyst particles within the article is at least 250 g/m$^2$.

2. The article of claim 1, wherein the catalyst particles comprise vanadium oxide on titanium oxide.

3. The article of claim 1, wherein said polymer adhesive comprises at least one of: FEP, PTFE, HMWPE and HMWPP, PFA, PVDF, THV or CFE.

4. The article of claim 1, wherein said staple fibers further comprise a tortuous surface geometry or a trilobal surface geometry.

5. The article of claim 1, wherein said high temperature fluoropolymer scrim comprises PTFE.

6. The article of claim 1, further comprising a microporous layer attached to at least a portion of the porous substrate.

7. The article of claim 6, wherein the microporous layer comprises expanded PTFE membrane.

8. The article of claim 6, wherein the microporous layer is on the upstream side of the porous substrate, within the porous substrate, or on the downstream side of the porous substrate.

9. The article of claim 8, wherein the microporous layer is a first microporous layer, and further comprising a second microporous layer on one of the upstream or downstream side of the porous substrate opposite the first microporous layer.

10. The article of claim 1, wherein the porous substrate and at least one microporous layer are arranged in the form of a filter bag comprising an inner filter bag and an outer filter bag arranged around the inner filter bag in a two-bag system.

11. A filter comprising:
at least one porous felt substrate consisting essentially of polyimide fibers attached to a high temperature fluoropolymer scrim, the felt substrate having a plurality of catalyst particles adhered to a surface thereof by a polymer adhesive, wherein the catalyst particles are tethered to the porous felt substrate by polymer adhesive strings; and
wherein a mass loading of the catalyst particles within the filter is at least 250 g/m$^2$.

12. The filter of claim 11, wherein the catalyst particles are chosen from at least one of Pt, Pd, Au, Rh, Fe, Cu, Al, compounds, or combinations thereof, and vanadium oxide, on particles chosen from at least one of: titanium oxides, aluminum oxides, silica, zeolite, or combinations thereof.

13. The filter of claim 11, wherein the catalyst particles comprise at least one composition chosen from at least one of: vanadium oxide on metal oxide particles, platinum on metal oxide particles, or combinations thereof and further comprising a microporous layer attached to at least a portion of the at least one porous substrate.

14. The filter of claim 11,
wherein the catalyst particles comprise $V_2O_5$ on particles of anatase titanuim dioxide.

15. An article comprising:
a first porous felt substrate;
a second porous felt substrate; and
a woven scrim positioned between and attached to said first and second porous felt substrates,
wherein at least one of the first or second felt substrate consists essentially of polyimide fibers,
wherein at least one of said first porous substrate or said second porous felt substrate has catalyst particles adhered to the surface thereof by a polymer adhesive, and
wherein said catalyst particles are tethered to said polymer adhesive by polymer strings
wherein a mass loading of catalyst particles within the article is at least 250 g/m$^2$.

16. The article of claim 15, wherein said first and second substrates are fibrous batts and wherein said batts are entangled with said scrim.

17. The article of claim 15, further comprising a microporous layer affixed to a side of said first substrate opposite said woven scrim.

18. The article of claim 15, wherein the adhesive further comprises dispersion primary polymer particles.

* * * * *